UNITED STATES PATENT OFFICE.

OTTO ZEITSCHEL, OF HAMBURG, GERMANY.

PROCESS FOR THE MANUFACTURE OF ACID ESTERS OF CYCLICAL TERPENE ALCOHOLS.

No. 907,941.

Specification of Letters Patent.

Patented Dec. 29, 1908.

Application filed July 30, 1907. Serial No. 386,258.

*To all whom it may concern:*

Be it known that I, OTTO ZEITSCHEL, a subject of the German Emperor, and a resident of Hamburg, Germany, have invented a new and Improved Process for the Manufacture of Acid Esters of Cyclical Terpene Alcohols, of which the following is a specification.

This invention relates to a process for obtaining the acid esters of the cyclical terpene alcohols of the formula $C_{10}H_{17}OH$ from terpenes, such as pinene, camphene, fenchene, or from other materials containing said substances, such as oil of turpentine.

In carrying out my invention, the above materials are mixed with organic acids, (such as acetic acid, valerianic acid, butyric acid, palmitic acid, benzoic acid, phthalic acid, salicylic acid, cinnamic acid), in approximately molecular proportions, and then the mixture is heated to a temperature of about 200° C., such temperature being maintained for a few hours, say five hours. The product is cooled, any remaining acid is removed in manner according to the kind used, and the resulting neutral product is subjected to fractional distillation, so as to separate the pure acid ester.

My improved process may be carried out as follows:

1. 136 kg. (1 mol.) of French turpentine oil are heated with 60 kg. acetic acid (1 mol.) in autoclaves to a temperature of 200° C. and maintained at that temperature for about 5 hours. After cooling, the excess of acid is removed and the neutral product of reaction is submitted to fractional distillation. If the process is properly carried out the resinification is very insignificant and about 10–15% camphene (including fenchene), 30–40% limonene (dipentene) and about 40% acetates of borneol (including fenchyl acetate) are obtained.

2. 136 kg. (1 molecule) turpentine oil or the corresponding molecular quantity of a material containing camphene or fenchene are heated with 100 kg. (about 1 molecular proportion) of benzoic acid in autoclaves to about 200° C. and maintained at that temperature for about 5 hours. After cooling, the excess of acid is removed and the esters which are not easily volatile, are separated, by refining with steam from the volatile terpenes which, in their turn, are subjected to fractional distillation.

The products obtained can be used for instance for manufacturing Borneo oils and camphor or for perfumery purposes.

The course of reaction for pinene is illustrated in the following formula, in which R stands for an acid radical. If thus, the radical $CH_3CO_2$ of acetic acid is substituted for R, the formula illustrates the reaction of the first example. If the radical $C_6H_5CO_2$ of benzoic acid is substituted for R, the reaction of the second example is illustrated by the formula:

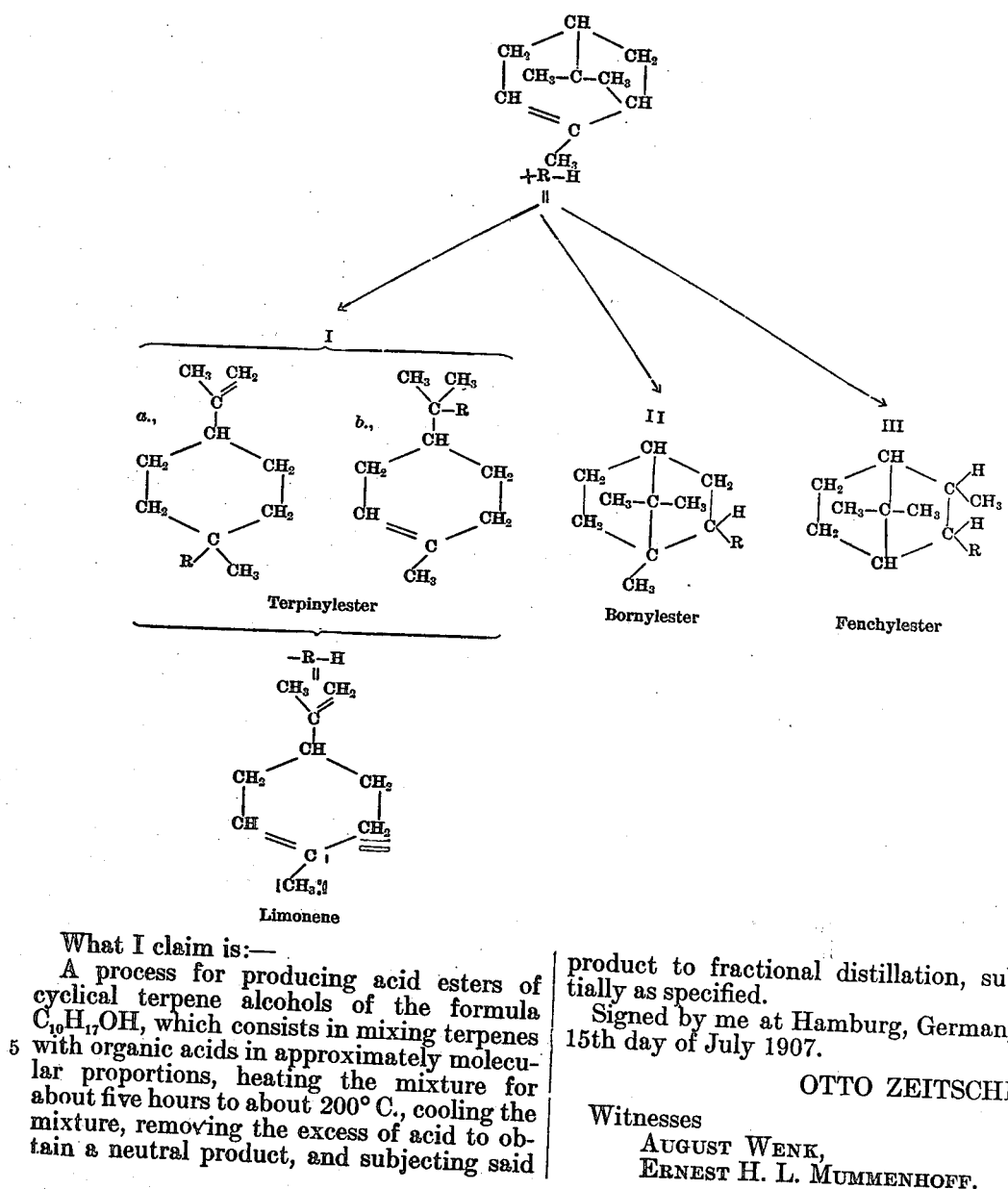

What I claim is:—

A process for producing acid esters of cyclical terpene alcohols of the formula $C_{10}H_{17}OH$, which consists in mixing terpenes with organic acids in approximately molecular proportions, heating the mixture for about five hours to about 200° C., cooling the mixture, removing the excess of acid to obtain a neutral product, and subjecting said product to fractional distillation, substantially as specified.

Signed by me at Hamburg, Germany this 15th day of July 1907.

OTTO ZEITSCHEL.

Witnesses
 AUGUST WENK,
 ERNEST H. L. MUMMENHOFF.